(12) United States Patent
Canfield et al.

(10) Patent No.: US 10,325,263 B2
(45) Date of Patent: Jun. 18, 2019

(54) SYSTEMS AND METHODS FOR PROVIDING RISK INFORMATION

(71) Applicant: WEPAY, INC., Palo Alto, CA (US)

(72) Inventors: John R. Canfield, San Carlos, CA (US); Vasusen Patil, Mountain View, CA (US); Eric Stern, East Palo Alto, CA (US)

(73) Assignee: WePay, Inc., Redwood City, CA (US)

( * ) Notice: Subject to any disclaimer, the term of this patent is extended or adjusted under 35 U.S.C. 154(b) by 221 days.

(21) Appl. No.: 14/911,873

(22) PCT Filed: Feb. 25, 2015

(86) PCT No.: PCT/US2015/017563
§ 371 (c)(1),
(2) Date: Feb. 12, 2016

(87) PCT Pub. No.: WO2015/130814
PCT Pub. Date: Sep. 3, 2015

(65) Prior Publication Data
US 2016/0358179 A1    Dec. 8, 2016

Related U.S. Application Data

(60) Provisional application No. 61/944,481, filed on Feb. 25, 2014.

(51) Int. Cl.
*G06Q 20/40* (2012.01)
*G06F 16/28* (2019.01)
*G06Q 30/06* (2012.01)

(52) U.S. Cl.
CPC ....... *G06Q 20/4016* (2013.01); *G06F 16/285* (2019.01); *G06F 16/288* (2019.01); *G06Q 20/405* (2013.01); *G06Q 30/0609* (2013.01)

(58) Field of Classification Search
CPC .................................................. G06Q 20/4016
See application file for complete search history.

(56) References Cited

U.S. PATENT DOCUMENTS

| 7,376,618 B1 * | 5/2008 | Anderson | G06Q 20/10 705/38 |
| 8,661,038 B1 * | 2/2014 | Whittam | G06Q 30/02 707/737 |

(Continued)

OTHER PUBLICATIONS

Dharwa, Jyotindra et al., "A Data Mining with Hybrid Approach Based Transaction Risk Score Generation Model (TRSGM) for Fraud Detection of Online Financial Transaction", International Journal of Computer Applications (0975-8887) vol. 16—No. 1, Feb. 2011. (Year: 2011 ).*

(Continued)

*Primary Examiner* — Eric T Wong
(74) *Attorney, Agent, or Firm* — Duane Morris; Manita Rawat (57) ABSTRACT

A system includes one or more client members connected to one or more primary users and/or one or more end users. The client member receives risk data from the primary user and the end user, and the risk data includes one or more risk variables. A service provider is connected to the client member, and receives at least one of the risk variables from the client member and identifies whether the risk variable corresponds to an undefined type value or a predefined type value. The service member updates an existing database by storing the risk variable under a non-standard type category when the risk variable is identified as the undefined type value. The service member determines whether the received risk variable is a viable risk and a notification is transmitted to the client member when the viable risk is determined.

20 Claims, 2 Drawing Sheets

(56) References Cited

U.S. PATENT DOCUMENTS

| | | | |
|---|---|---|---|
| 2009/0292568 A1 | 11/2009 | Khosravani et al. | |
| 2011/0178948 A1 | 9/2011 | Cheng et al. | |
| 2012/0096557 A1 | 4/2012 | Britton et al. | |
| 2012/0116954 A1* | 5/2012 | Lawrence | G06Q 20/10 705/38 |
| 2014/0019334 A1* | 1/2014 | Cervera | G06Q 40/025 705/38 |

OTHER PUBLICATIONS

PCT International Preliminary Report on Patentability dated Sep. 9, 2016 in International Application No. PCT/US2015/017563. 8 pages.

Korean Intellectual Property Office (KIPO ISA), (Examiner-Lee, Myung Jin), International Search Report dated May 29, 2015, pp. 1-2.

EP Extended Search Report dated Jun. 13, 2017 in EP Application No. 15756052.5. 7 pages.

\* cited by examiner

SYSTEMS AND METHODS FOR PROVIDING RISK INFORMATION

RELATED AND CO-PENDING APPLICATIONS

The present application is a national stage application under U.S.C. § 371 of International Patent Application No. PCT/US2015/017563, filed Feb. 25, 2015, which claims the benefit of U.S. Provisional Patent Application No. 61/944,481 filed on Feb. 25, 2014; the entireties of each are expressly incorporated herein by reference.

BACKGROUND

Many systems, using computing devices, enable payment transactions or services over a network. For example, at least some known platforms serve as marketplaces, such as Care.com, crowdfunding sites, such as GoFundMe, or business or invoice tool providers, such as Freshbook.com. Such known platforms do not typically receive payments for themselves. Instead, they facilitate transactions and payments between their customers—a payee and a payer, wherein the payee can be a business selling goods or services, an event organizer, a non-profit, a club or organization, or an individual raising funds for personal needs, and the payer can be a customer of the payee. For example, Freshbook.com can be a platform that provides accounting services, such as sending out invoices that the payee can use for submission to the payer.

Providing such services can be challenging for the platform due to the risks associated with it, such as chargeback risks and/or fraud, and the complexity surrounding risk management. At least some known risk management systems can collect and verify a wide variety of data points about the payer, payee and transaction. These data points can be inputted into a decisioning system that uses rules and/or models to make the best possible decision on whether to accept or decline a transaction. Although some risk data can be collected from third party data sources, some data may still need to be collected and verified directly with the user. As such, the entity responsible for risk management may directly interact with the user.

At least some known platforms would prefer to outsource payment risk management and not invest in the costly personnel and technology needed. However, many platforms also want to control all interactions with their customers or users. As such, the platforms have a dilemma as to whether to control all user interaction and take on responsibility for risk management, or to give up control and outsource risk management to their payment provider. Another dilemma for platforms is deciding who has the best data to make payment risk decisions. For example, the payments provider has payment related data and expertise in payments risk. On the other hand, the platform has data about their customers that is unique to them, like feedback scores, detailed information about the transaction and in some cases personal knowledge. At least some known platforms also have a dilemma because they need to make decisions important to the trust and safety of their platform that go beyond payment risk.

BRIEF DESCRIPTION

In some embodiments, the system described herein enables a risk management service provider ("service provider") to work with a platform ("client member") such that the platform or client member can pass relevant information about their users, such as a payee ("primary user") and a payer ("end user") to the service provider. As such, the client member is enabled to obtain and handle user interactions while passing the collected information to the service provider for decisioning such that the service provider does not interact with the primary user and the payer. For example, in one embodiment, a system includes one or more client members that are connected to one or more primary users and/or one or more end users, wherein the client member is configured to receive primary user risk data from the primary user and end user risk data from the end user, and wherein the primary user risk data and the end user risk data each includes one or more risk variables. The system further includes a service provider that is connected to the client member. The service provider includes a computing device that is configured to receive at least one of the risk variables from the client member and to identify a type value for the received risk variable, wherein the identified type value corresponds to an undefined type value or a predefined type value. The computing device is further configured to update an existing database by storing the received risk variable under a non-standard type category therein when the identified type value for the received risk variable is the undefined type value. The computing device is configured to determine whether the received risk variable is a viable risk and to transmit a notification to the client member when the viable risk is determined.

In another embodiment, a method for providing risk information is provided. The method includes connecting one or more client members to a service provider via a network, wherein the client member includes primary user risk data received from one or more primary users and end user risk data received from one or more end users, the primary user risk data and the end user risk data each includes one or more risk variables. At least one of the risk variables from the client members is transmitted to the service provider, wherein the service provider includes a computing device. The method further includes identifying a type value for the received risk variable via the computing device, wherein the identified type value corresponds to an undefined type value or a predefined type value. An existing database updated by storing the received risk variable under a non-standard type category therein when the identified type value for the received risk variable is the undefined type value. The method also, includes determining whether the received risk variable is a viable risk and transmitting a notification to the client members when the viable risk is determined.

In yet another embodiment, at least one computer-readable storage medium having computer-executable instructions embodied thereon is provided, wherein, when executed by at least one processor, the computer-executable instructions cause the processor to connect to one or more client members via a network, wherein the client member includes primary user risk data received from one or more primary users and end user risk data received from one or more end users, and wherein the primary user risk data and the end user risk data each includes one or more risk variables. The computer-executable instructions further cause the processor to receive at least one of the risk variables from the client member and to identify a type value for the received risk variable, wherein the identified type value corresponds to an undefined type value or a predefined type value. The computer-executable instructions also cause the processor to update an existing database by storing the received risk variable under a non-standard type category therein when the identified type value for the received risk variable is the undefined type value. The computer-executable instructions further cause the processor to determine whether the received risk variable is a viable risk and transmit a notification to the client members when the viable risk is determined.

DETAILED DESCRIPTION

Figure 1:
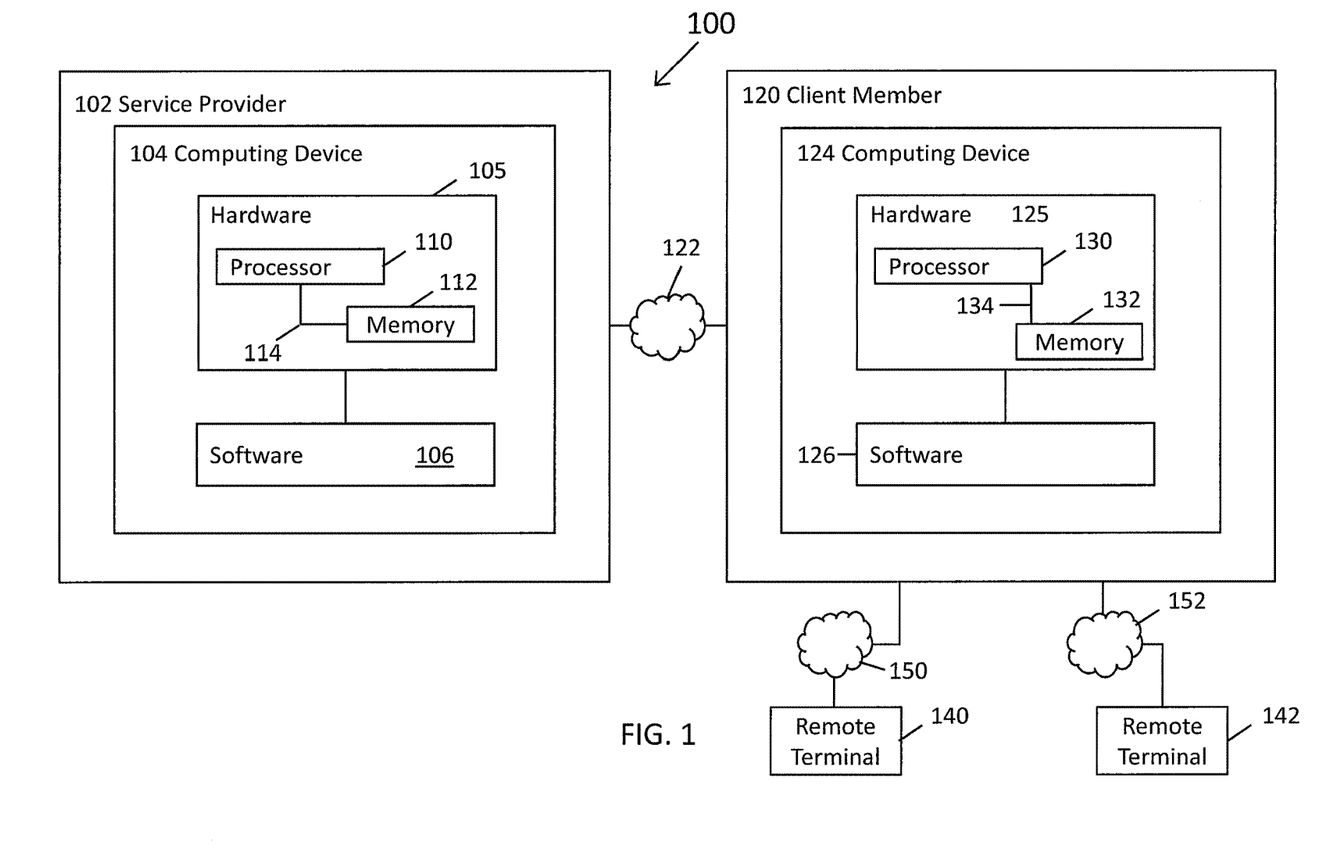
FIG. 1 is a block diagram of an exemplary system that includes a risk management service provider ("service provider"), one or more platforms ("client members"), one or more payees ("primary users"), and one or more payers ("end users")

FIG. 1 illustrates an exemplary system 100 that includes a risk management service provider ("service provider") 102 that includes one or more computing devices or hosts 104. In the some embodiments, computing device 104 includes a hardware unit 105 and software 106. Software 106 can run on hardware unit 105 such that various applications or programs can be executed on hardware unit 105 by way of software 106. In some embodiments, the functions of software 106 can be implemented directly in hardware unit 105, e.g., as a system-on-a-chip, firmware, field-programmable gate array (FPGA), etc. In some embodiments, hardware unit 105 includes one or more processors, such as processor 110. In some embodiments, processors 110 is an execution unit, or "core," on a microprocessor chip. In some embodiments, processors 110 may include a processing unit, such as, without limitation, an integrated circuit (IC), an application specific integrated circuit (ASIC), a microcomputer, a programmable logic controller (PLC), and/or any other programmable circuit. Alternatively, processor 110 may include multiple processing units (e.g., in a multi-core configuration). The above examples are exemplary only, and, thus, are not intended to limit in any way the definition and/or meaning of the term "processor."

Hardware unit 105 also includes a system memory 112 that is coupled to processor 110 via a system bus 114. Memory 112 can be a general volatile random access memory (RAM). For example, hardware unit 105 can include a 32 bit microcomputer with 2 Mbit ROM and 64 Kbit RAM, and/or a few GB of RAM. Memory 112 can also be a read-only memory (ROM), a network interface (NIC), and/or other device(s). In some embodiments, computing device 104 can also include at least one media output component (not shown) for use in presenting information to a user. The media output component can be any component capable of conveying information to a user and may include, without limitation, a display device (not shown) (e.g., a liquid crystal display (LCD), an organic light emitting diode (OLED) display, or an audio output device (e.g., a speaker or headphones)).

In some embodiments, computing device 104 includes an input or a user interface (not shown) for receiving input from a user. The input interface may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface.

In some embodiments, service provider 102 can be connected to one or more platforms ("client member") 120 (only one being shown in FIG. 1) via, for example, a network 122. Network 122 can be the Internet, a local area network (LAN), a wide area network (WAN), a personal area network (PAN), or any combination thereof, and network 122 can transmit information between service provider 102 and client member 120. Client member 120 can be, for example, a platform that serves as a marketplace, a crowdfunding sites, and/or a business or invoice tool provider.

Similar to service provider 102, client member 120 can also include a computing device 124 that includes a hardware unit 125 and software 126. Software 126 can run on hardware unit 125 such that various applications or programs can be executed on hardware unit 125 by way of software 126. In some embodiments, the functions of software 126 can be implemented directly in hardware unit 125, e.g., as a system-on-a-chip, firmware, FPGA, etc. In some embodiments, hardware unit 125 includes one or more processors, such as processor 130. In some embodiments, processors 130 is an execution unit, or "core," on a microprocessor chip. In some embodiments, processors 130 may include a processing unit, such as, without limitation, an IC, an ASIC, a microcomputer, a PLC, and/or any other programmable circuit. Alternatively, processor 130 may include multiple processing units (e.g., in a multi-core configuration). The above examples are exemplary only, and, thus, are not intended to limit in any way the definition and/or meaning of the term "processor."

Hardware unit 125 also includes a system memory 132 that is coupled to processor 130 via a system bus 134. Memory 132 can be a general volatile RAM. For example, hardware unit 125 can include a 32 bit microcomputer with 2 Mbit ROM and 64 Kbit RAM. Memory 132 can also be a ROM, a NIC, and/or other device(s). In some embodiments, computing device 124 can also include at least one media output component (not shown) for use in presenting information to a user. The media output component (not shown) can be any component capable of conveying information to a user and may include, without limitation, a display device (not shown) (e.g., a LCD, an OLED display, or an audio output device (e.g., a speaker or headphones)).

In some embodiments, computing device 124 includes an input or a user interface (not shown) for receiving input from a user. The input interface may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and input interface.

In some embodiments, one or more users may connect to, and interact with client member 120 by using separate remote terminals. For example, in some embodiments, one or more payees ("primary users") such as, for example, a business selling goods or services, an event organizer, a non-profit, a club or organization, or an individual raising funds for a personal needs, can connect to client member 120 by using one or more remote terminals 140 (only being shown in FIG. 1). Similarly, one or more payers ("end users"), such as a customer of the payee(s), can connect to client member 120 by using one or more remote terminals 142 (only one be shown in FIG. 1).

Each remote terminal 140 and 142 can be capable of communicating with client member 120 via separate networks 150 and 152, respectively. Each network 150 and 152 can be the Internet, a LAN, a WAN, a PAN, or any combination thereof, and each network 150 and 152 can transmit information between client member 120 and remote terminal terminals 140 and 142, respectively, at different rates or speeds. Remote terminals 140 and 142 can each be a desktop computer, laptop, mobile device, tablet, thin client, or other device having a communications interface (not shown). In some embodiments, each remote terminal 140 and 142 can also be capable of receiving user input from the primary user and the end user, respectively, and transmitting the received input to client member 120.

During operation of system 100, as explained in more detail below with respect to FIG. 2, client member 120 is able to receive data, such as risk data, from the primary user and the end user, and client member 120 is then able to efficiently transmit the data to service provider 102. The data can be systematically collected and analyzed by service provider 102 to determine whether any risks are at issue for client member 120.

Figure 2:
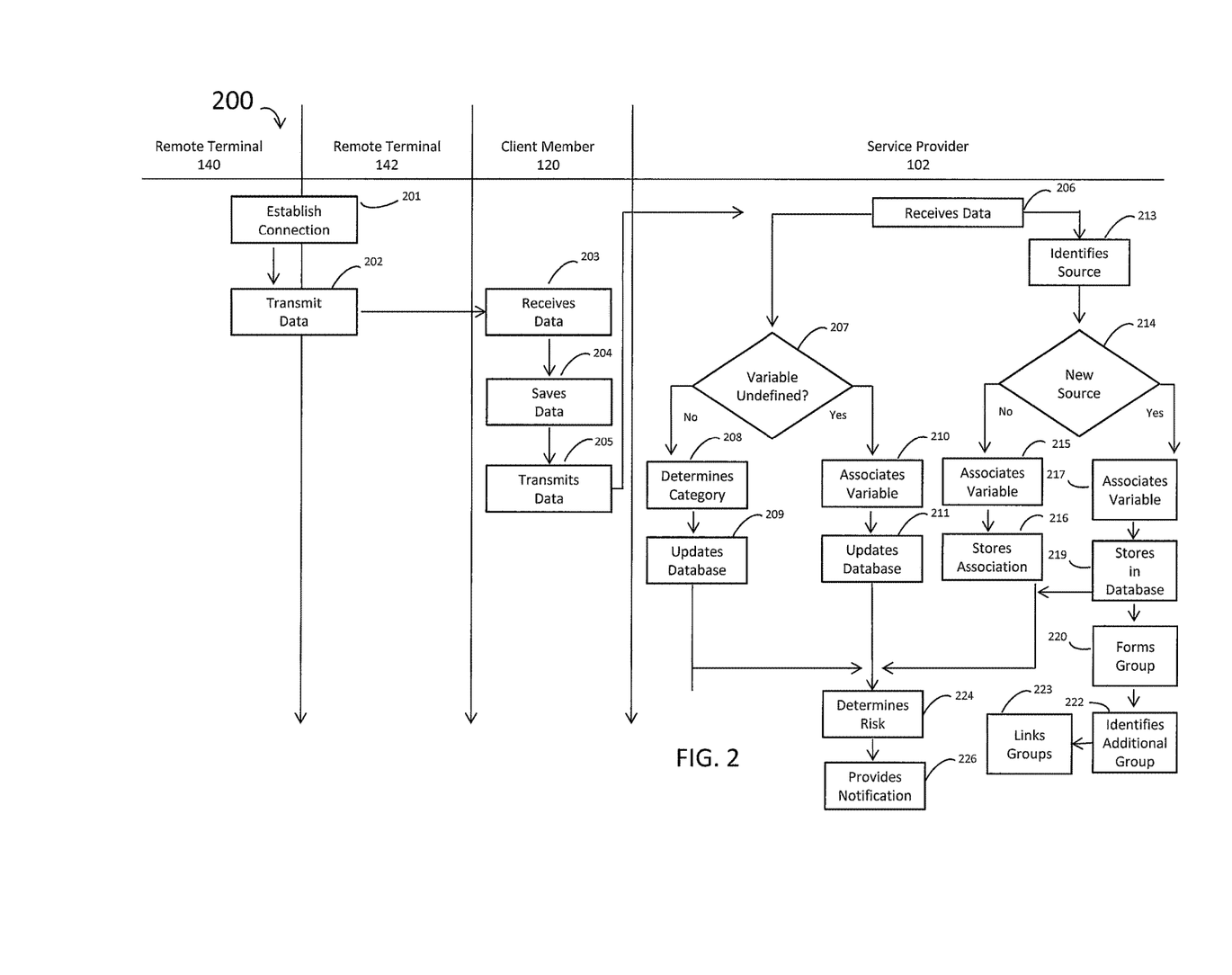
FIG. 2 is a swimlane diagram of an exemplary method for providing risk information using the system shown in FIG. 1.

FIG. 2 is a swimlane diagram 200 of an exemplary method for providing risk information using system 100 (shown in FIG. 1). This method may be embodied within a plurality of computer-executable instructions stored in one or more memories, such as one or more computer-readable storage mediums. Computer storage mediums include non-transitory media and may include volatile and nonvolatile, removable and non-removable mediums implemented in any method or technology for storage of information such as computer-readable instructions, data structures, program modules or other data. The instructions may be executed by one or more processors to perform the functions described herein.

In step 201, a primary user and an end user are undergoing a transaction, at which time the primary user uses remote terminal 140 and the end user uses remote terminal 142 to establish a connection with client member 120 using network 150 and 152, respectively. As such, the primary user and the end user can communicate with client member 120. In step 202, using remote terminal 140 and remote terminal 142, the primary user and the end user, respectively, can transmit data to client member 120. In step 203, client member 120 receives the data. The data can include various variables (i.e., risk variables), such as the respective names of the primary user and the end user. In some embodiments, the type of variables that are communicated between the client member 120 and the primary user and/or the end user is the type of data that can be used to determine risk associated with the primary user and/or the end user. For example, the different types of data can include personal name, employer, title, birthdate, business name, email address, physical address, phone number, tax identification number, industry code, business description, business website URL, external accounts (partner user account, account information for social media sites, etc.), other website content, including reviews, revenue, business legal structure, credit reports, other documents (business licenses, etc.), personal conversations/meeting notes, device information, verification information (e-mail verification, bank verification, etc.), risk review information, transaction details, including receipt/invoice and shipping details. In some embodiments, some information can be generated by client member 120 themselves. For example, client member 120 can do an assessment of the risk of the primary user and pass the result of that risk assessment to service provider 132.

For some users, there may be only a few data elements, but for others there may be many data elements. Even within a single data type, there may be multiple versions. For example, a small online business may have many different physical addresses associated with them: address of incorporation (possibly the address of their incorporation agent), home office addresses for some of their key employees, official mailing PO Box or vanity address, address of the warehouse where some of their operations take place. Each of these addresses may be associated with a different touchpoint. For example, the address of incorporation appears on various legal documents, but the warehouse address may appear on their credit report. The riskiness of the business can be assessed when these multiple addresses are known, put in the right context and verified. The same is true with people, phone numbers, email addresses, websites, and most of the data types identified above.

Upon receiving the data, client member 120 can save the data (i.e., the variables) within a database (not shown) within computing device 124 (shown in FIG. 1) in step 204 and/or transmit the data to service provider 102 in step 205 such that service provider 102 can identify any risks that are at issue within the data received from the primary user and the end user.

Service provider 102 receives the data in step 206. For example, service provider 102 receives at least one risk variable provided by the primary user and/or the end user. In step 207, service provider 102 identifies a type value for the received risk variable, wherein the identified type value can be an undefined type value or a predefined type value. For example, service provider 102 has received data from client member 120 in the past, and the data has included various variables that correspond to different data types, such as name and address. Each time that a data type has been received in the past, it has been stored in an existing database (not shown) in computing device 104 (shown in FIG. 1) by service provider 102 under a standard type category, such as "physical address". As such, there are "predefined types" of data stored within the existing database. If the type was never received by service provider 102 in the past, then it is an "undefined type" of data and category exists in the database for the undefined type of data.

If service provider 102 identifies that the received risk variable corresponds to a predefined type value, then service provider 102, in step 208, determines which standard type category in the database corresponds to the predefined type value of the risk variable and service provider 102 associates the risk variable under the determined standard type category. In step 209, service provider 102 updates the database by storing the received risk variable under the standard type category therein.

Alternatively, if service provider 102 identifies that the received risk variable corresponds to an undefined type value, then service provider 102, in step 210, associates the risk variable under a non-standard type category. In step 211, the database is updated by storing the received risk variable under the non-standard type category therein. For example, if the risk variable received is a bank account number of the primary user or the end user and service provider 102 has never received bank account numbers in the past, then a new type category will be created for bank account numbers in the database so that future bank account numbers received can be categorized accordingly. In some embodiments, service provider 132 can create a new category when the risk variable is identified as being an undefined type the risk variable, and the risk variable can be organized under the newly created category within the database. Similarly, service provider 102 also analyzes the source of where the data is received from. For example, in step 213, service provider 102 identifies the source of the received risk variable and, in step 214, service provider 102 determines whether the identified source is a new source or a predefined source under a standard category in the existing database (i.e., a source that had provided risk variables in the past). If the source is deemed a predefined source, in step 215, service provider 102 associates the received risk variable with the standard source category. In step 216, the association of the risk variable with the standard source category is stored in the database.

Alternatively, if service provider 102 is deemed an undefined source, then, in step 217, service provider 102 associates the received risk variable with a non-standard source category. In step 219, the association of the risk variable with the non-standard source category is stored in the database. In some embodiments, service provider 102 can creates a new source category, wherein the new source category is associated or corresponds to the undefined source, and the association of the received risk variable with the new source category can be stored in the database.

In some embodiments, service provider 102, in step 220, organizes the received risk variable with the identified type value and the identified source to form a group set, such as the rbits discussed below. In step 222, service provider 102 identifies whether the formed group corresponds to another group stored in the database. For example, service provider 102 identifies whether there is another group having the same risk variable, the same type of variable, and the same source for the variable as the formed group. If there is a corresponding group, then in step 223, service provider 102 links the formed group with the other corresponding group.

In some embodiments, linking the course to the data type can be done by simply filling out the "source" and "type" property in any combination. In some embodiments, steps 220-223 are applied equally for all risk variables received, including defined and undefined type values and sources.

After all the creations and/or organizations are completed in steps 206 to 223, then service provider 102 determines whether the received risk variable is a viable risk in step 224. For example, in some embodiments, service provider 102 can compare the received risk variable with existing information in the database or information received from third parties and identify whether there are any inconsistencies with the variable. In step 226, service provider 102 transmits a notification to client member 120 if a risk is determined. For example, in some embodiments, service provider 102 transmits an email to client member 120 regarding the risk. In some embodiments, a notification can be can be sent to provide notification that no risk has been determined. In some embodiments, service provider 102 provides the notification to client member 120 via an application program interface using computing device 104 (shown in FIG. 1).

An execution of the creations and/or organizations described in steps 206-223 and/or the determination of the risk described in steps 224-226 can be performed using various data structures, commands and/or algorithms. For example, the concept of collecting the data in step 206-223 can be an rbit, an atomic bit of risk information. One embodiment of a data structure of an rbit is shown in Table 1.

TABLE 1

Exemplary Data Structure of an rbit

| Parameter | Required for create | Type | Description |
| --- | --- | --- | --- |
| rbit_id | Provided by WePay | Integer (64 bits) | The unique ID of the rbit object |
| associated_object_type | Yes* | String (32 chars) | The type of object that this rbit is associated with. Possible values are:<br>"account": for information about a payee<br>"user": for information about a payer with a WePay user id<br>"checkout": information about a checkout transaction<br>"checkout_payer": information about the payer in a checkout<br>"preapproval": information about a preapproval transaction<br>"preapproval_payer": information about a preapproval payer<br>"subscription": information about a subscription<br>"subscription_payer": information about a subscription payer<br>"credit_card": information about the owner of a credit card<br>*This field is not required if the rbit object is created during an embedded/account,/checkout,/preapproval, or/ subscription call |
| associated_object_id | Yes* | Integer (64 bits) | The unique ID of the object that this rbit is associated with. *This field is not required if the rbit object is created during an embedded/account,/checkout,/preapproval, or/ subscription call |
| time_obtained | Yes | Integer (64 bits) | The unixtime when the data in this rbit object was first obtained.<br>For example, if a WePay account is created for a long-standing customer on the partner site, the time_obtained will reflect when the original data was obtained from the end-user, not the time it was passed to WePay. |
| source | Yes | String (255 chars) | Source of the information (see source standard values) |

TABLE 1-continued

Exemplary Data Structure of an rbit

| Parameter | Required for create | Type | Description |
|---|---|---|---|
| note | No | String (65535 chars) | Free form note giving more details/context about the information. Used by Risk Analysts during manual review. |
| type | Yes | String (255 chars) | The type of the rbit object. Standard types are defined below. |
| properties | Yes | Object | Key-value pair of properties for this type. The properties of the rbit object will depend on the type. For non-standard types, parameters can be any combination of key-value pairs as long as keys only consist of letters, numbers, and underscores. |
| related_rbits | No | Array of rbit objects | This optional property contains an array of rbits that are related to this rbit. For example, a person rbit could have an address, phone number, and social security number that are associated with that person and should be embedded as related rbits. If an rbit is primarily associated with associated_object, then it should be passed as a top-level rbit and not as a related rbit. For example, a business phone number should be passed as a top-level rbit for the account, whereas a home phone number for one employee should be passed as a related rbit associated with the person rbit. |
| is_standard | Provided by WePay | Boolean | This value is set by WePay: True: the rbit type and properties match standard values defined by WePay False: the rbit type and properties do not match standard values defined by WePay (for example, type = "personal_name" instead of "person_name."). Non-standard data can still be used by WePay, but if there is a standard way to pass the data that will have more value. |
| is_valid | Provided by WePay | Boolean | This value is set by WePay: True: there are no validation issues with the values in the rbit False: there is one or more validation issue with the values in the rbit (for example, a social security number with only 8 digits). |
| validation_reason | Optional provided by WePay | Array of strings (1024 chars) | If is_standard or is_validation is false, this field will have an array of strings explaining one or more reasons why it is false. |

The associated_object_type and associated_object_id link the rbit to a user, payment account, checkout or other major object within the system schema. Below is an example of data/information that can be gathered from client member 120 that is combined with a phone verification made on the same phone number.

1. Create a business_report node regarding the Guidestar report found for this account. The Tax_ID and phone number also provided in the Guidestar report are provided as related_rbits.

```
{
"associated_object_type":"account",
"associated_object_id":12345678,
"time_obtained": 1367958263
"type":"business_report",
"source":"guidestar",
"properties":[
{"report_url":"http://www.guidestar.org/organizations/53-0196605/
american-national-red-cross.aspx"}]
"related_rbits":[
{
"time_obtained": 1367958263
"type":"tax_id",
"source":"guidestar",
"properties":[
{"tax_id":"53-0196605"},
{"tax_id_country":"US"},
{"tax_id_type":"business"}]
},
{
"time_obtained": 1367958263
"type":"phone",
"source":"guidestar",
"properties":[
{"phone_number":"+1-800-733-2767"},
{"phone_type":"work"}]
}
response: {rbit_id: 5793003,
          is_standard: true,
          is_valid:true}
```

By using method 200, client member 120 can pass relevant information about their users, such as the primary user and the end user, to service provider 102 such that service provider 102 does not interact with the users. As such, client member 120 is enabled to obtain and handle the users' interactions while passing the collected information to service provider 102 for decisioning. In some embodiments, service provider 102 may still interact with the users, but the amount of interaction and/or questions with the users can be minimized due to the information passed during method 200.

Moreover, the collection of the data by service provider 102 from client member 120, as shown in steps 206-222, enables service provider 102 to support an infinite number of sub data types by simply creating a new type value when the received risk variable corresponds to an undefined type value that service provider 102 had not received before in the past. Similarly, the creation of a source type enables service provider 102 and/or client member 120 to identify a large variety of sources for each risk variable received. In some embodiments, phone numbers, addresses, tax IDs, names, and many other types of, for example, rbits, can come from many different sources (white pages, web content, business reports, the user themselves, third parties, etc). During the use of rbits, by making rbits atomic, linking the source to the data type can be done by simply filling out the "source" and "type" property in any combination. Moreover, in some embodiments, when using rbits, it is easy to update a single piece of information (for example, a new phone number) by modifying just that specific rbit. In some embodiments, the "properties" property is very flexible because it can accept an arbitrary array of key-value pairs. This enables any type of data to be passed through an rbit.

In some embodiments, when using rbits, they will have standard values for "type", but can also support non-standard (undefined) values. When performing method 200, if a user passes a non-standard type rbit, they can pass any combination of key-value pairs they choose in the "properties" property. As such, client member 120 does not need to wait for service provider 102 to make changes in order to pass new types of information to service provider 102. As shown in method 200, this data will be accepted and stored by service provider 102 and can be used for risk review or analysis and other parts of the risk process. Service provider 102 can then make the type standard at a later point, in which case it can derive even more benefit from the data it has already received.

Moreover, as shown in the exemplary report above, the related_rbits property is a way for client member 120 to readily link together rbits that are associated with each other. In the example above, a business_report rbit sourced from an exemplary report from an exemplary client member contains related_rbits for the tax_ID and phone that were provided in the report. This structure allows a wide variety of information to be captured.

Identifying supporting and contradictory information can be helpful for risk investigations or analysis. When using, for example, atomic rbits for method 200, multiple values of the same data type are enabled. For example, the business address provided by a report might be different than the address provided by the primary user or end user. The two addresses can both be stored in separate rbits with their own source value. In some embodiments, further risk algorithms and verification methods can then work to determine whether none, one or both addresses are accurate.

As such, system 100 and method 200 further enable service provider 102 to make decisions using the combination of the service provider's existing data and the client member's data about the users. The system further enables information to be shared back with client member 120.

An execution of the creations and/or organizations described in steps 206-222 and/or the determination of the risk described in steps 224-226 can be performed using various data structures, commands and/or algorithms. For example, as described above rbits can be used. Additional embodiments using rbits to perform method 200 are described in U.S. Provisional Patent Application No. 61/944,481 filed on Feb. 25, 2014, which is expressly incorporated herein in its entirety.

Exemplary embodiments of systems and methods are described above in detail. The systems and methods are not limited to the specific embodiments described herein, but rather, components of each system and/or method may be utilized independently and separately from other components described herein. For example, each system may also be used in combination with other systems and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more client members connected to at least one of one or more primary users and one or more end users, wherein said one or more client members are configured to receive primary user risk data from the one or more primary users and end user risk data from the one or more end users, wherein the primary user risk data and the end user risk data each includes one or more risk variables; and
a service provider connected to said one or more client members, wherein said service provider comprises a computing device that is configured to:
receive at least one of the one or more risk variables from said one or more client members;
identify a type value for the received at least one risk variable, wherein the identified type value corresponds to an undefined type value that had not been previously received by said service provider or a predefined type value that had been previously received by said service provider;
update an existing database by storing the received at least one risk variable under a non-standard type category therein when the identified type value for the received at least one risk variable is the undefined type value;
determine whether the received at least one risk variable is a viable risk; and
transmit a notification to said one or more client members when the viable risk is determined.

2. A system in accordance with claim 1, wherein said computing device is further configured to update an existing database by storing the received at least one risk variable under a standard type category therein when the identified type value for the received at least one risk variable is the predefined type value.

3. A system in accordance with claim 1, wherein said computing device is further configured to:
identify the source of the received at least one risk variable; and
determine whether the identified source is a new source or a predefined source under a standard source category in the existing database.

4. A system in accordance with claim 3, wherein said computing device is further configured to:
associate the received at least one risk variable with the standard source category in the existing database when the identified source is determined to be the predefined source; and
store the association of the at least one risk variable with the standard source category in the existing database.

5. A system in accordance with claim 3, wherein said computing device is further configured to:
associate the received at least one risk variable with a non-standard source category when the identified source is an undefined source; and
update an existing database by storing the association of the at least one risk variable with the non-standard source category therein.

6. A system in accordance with claim 3, wherein said computing device is further configured to organize the received at least one risk variable with the identified type value and the identified source to form a group set.

7. A system in accordance with claim 6, wherein said computing device is further configured to identify whether the formed group set is linked with a different group set in the existing database.

8. A method for providing risk information, wherein said method comprises:
connecting one or more client members to a service provider via a network, wherein the one or more client members include primary user risk data received from one or more primary users and end user risk data received from one or more end users, the primary user risk data and the end user risk data each includes one or more risk variables;
transmitting at least one of the one or more risk variables from the one or more client members to the service provider, wherein the service provider includes a computing device;
identifying a type value for the received at least one risk variable via the computing device, wherein the identified type value corresponds to an undefined type value that had not been previously received by the service provider or a predefined type value that had been previously received by the service provider;
updating an existing database by storing the received at least one risk variable under a non-standard type category therein when the identified type value for the received at least one risk variable is the undefined type value;
determining whether the received at least one risk variable is a viable risk; and
transmitting a notification to the one or more client members when the viable risk is determined.

9. A method in accordance with claim 8, further comprising updating an existing database by storing the received at least one risk variable under a standard type category therein when the identified type value for the received at least one risk variable is the predefined type value.

10. A method in accordance with claim 8, further comprising:
identifying the source of the received at least one risk variable; and
determining whether the identified source is a new source or a predefined source under a standard source category in the existing database.

11. A method in accordance with claim 10, further comprising:
associating the received at least one risk variable with the standard source category in the existing database when the identified source is determined to be the predefined source; and
storing the association of the at least one risk variable with the standard source category in the existing database.

12. A method in accordance with claim 10, further comprising:
associating the received at least one risk variable with a non-standard source category when the identified source is an undefined source; and
updating an existing database by storing the association of the at least one risk variable with the non-standard source category therein.

13. A method in accordance with claim 10, further comprising:
organizing the received at least one risk variable with the identified type value and the identified source to form a group set.

14. A method in accordance with claim 13, further comprising identifying whether the formed group set is linked with a different group set in the existing database.

15. At least one non-transitory computer-readable storage medium having computer-executable instructions embodied thereon, wherein, when executed by at least one processor, the computer-executable instructions cause the at least one processor to:
connect to one or more client members via a network, wherein the one or more client members include primary user risk data received from one or more primary users and end user risk data received from one or more end users, the primary user risk data and the end user risk data each includes one or more risk variables;
receive at least one of the one or more risk variables from the one or more client members;
identify a type value for the received at least one risk variable, wherein the identified type value corresponds to an undefined type value that had not been previously received by the at least one processor or a predefined type value that had been previously received by the at least one processor;
update an existing database by storing the received at least one risk variable under a non-standard type category therein when the identified type value for the received at least one risk variable is the undefined type value;
determine whether the received at least one risk variable is a viable risk; and
transmit a notification to the one or more client members when the viable risk is determined.

16. At least one non-transitory computer-readable storage medium in accordance with claim 15, wherein the computer-executable instructions further cause the at least one processor to update an existing database by storing the received at least one risk variable under a standard type category therein when the identified type value for the received at least one risk variable is the predefined type value.

17. At least one non-transitory computer-readable storage medium in accordance with claim 15, wherein the computer-executable instructions further cause the at least one processor to:
- identify the source of the received at least one risk variable; and
- determine whether the identified source is a new source or a predefined source under a standard source category in the existing database.

18. At least one non-transitory computer-readable storage medium in accordance with claim 17, wherein the computer-executable instructions further cause the at least one processor to:
- associate the received at least one risk variable with the standard source category in the existing database when the identified source is determined to be the predefined source; and
- store the association of the at least one risk variable with the standard source category in the existing database.

19. At least one non-transitory computer-readable storage medium in accordance with claim 17, wherein the computer-executable instructions further cause the at least one processor to:
- associate the received at least one risk variable with a non-standard source category when the identified source is an undefined source; and
- update an existing database by storing the association of the at least one risk variable with the non-standard source category therein.

20. At least one non-transitory computer-readable storage medium in accordance with claim 17, wherein the computer-executable instructions further cause the at least one processor to:
- organize the received at least one risk variable with the identified type value and the identified source to form a group set; and identify whether the formed group set is linked with a different group set in the existing database.

* * * * *